Nov. 15, 1955     J. McORLLY     2,724,043
ELECTRIC HEATING DEVICES

Original Filed Dec. 15, 1951     2 Sheets-Sheet 1

INVENTOR.

BY    Joseph McOrlly

C. B. Stevens
Attorney

Nov. 15, 1955 J. McORLLY 2,724,043
ELECTRIC HEATING DEVICES
Original Filed Dec. 15, 1951 2 Sheets-Sheet 2
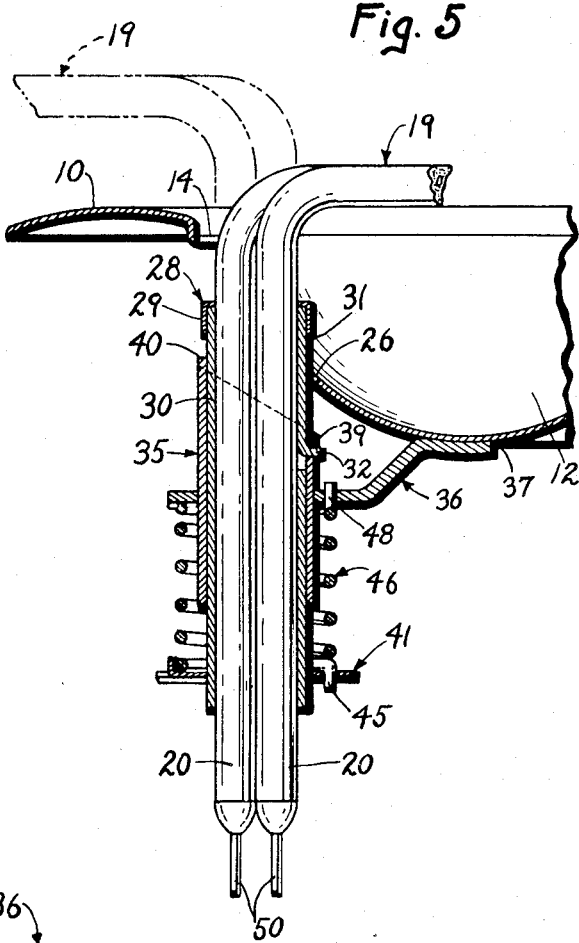
Fig. 5
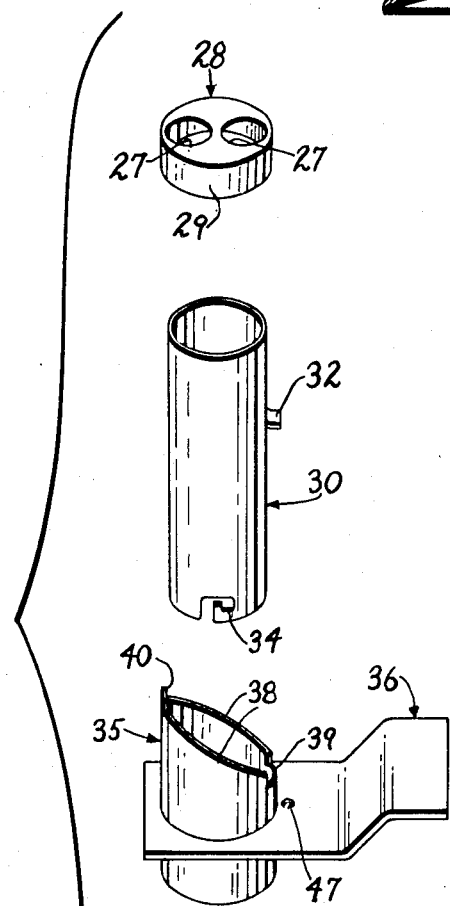
Fig. 6
INVENTOR.
Joseph McOrlly
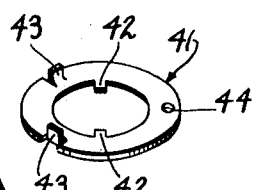
BY
Attorney

2,724,043

ELECTRIC HEATING DEVICES

Joseph McOrlly, Wilkinsburg, Pa., assignor to Edwin L. Weigand Company, Pittsburgh, Pa., a corporation of Pennsylvania Original application December 15, 1951, Serial No. 261,857. Divided and this application May 2, 1952, Serial No. 285,719

8 Claims. (Cl. 219—37)

This invention pertains to an electric heating device of the type adapted for use with a cooking range or hot plate, and is a division of application, Serial No. 261,857, filed December 15, 1951.

It is generally customary in cooking ranges or hot plates to have a heating element which may be either a flat plate or a convoluted tubular element, or elements, shaped to present a flat heating surface or area to the article or material to be heated. Such heating elements are mounted upon a support or spider which is positioned above a reflector or drip pan. It is desirable that the reflector or drip pan and the spider or support may be rendered accessible by removal of the heating element in order that the reflector or drip pan may be cleaned of food particles or grease which may fall thereonto during the cooking operation. It is one object of this invention to provide a mounting for a heating element which will permit the heating element to be easily moved into and out of a position of registry with the reflector or drip pan forming a part of the heating unit.

Various other objects and advantageous features of the invention may be had from the following description when taken in conjunction with the accompanying drawings wherein similar characters of reference designate corresponding parts, and wherein:

Figure 5 is a fragmentary view, taken on the line 5—5 of Figure 1, showing a hinged mounting for the heating element; and Figure 6 is an exploded view showing various parts of the hinged mounting in dissembled relation.

Figure 1:
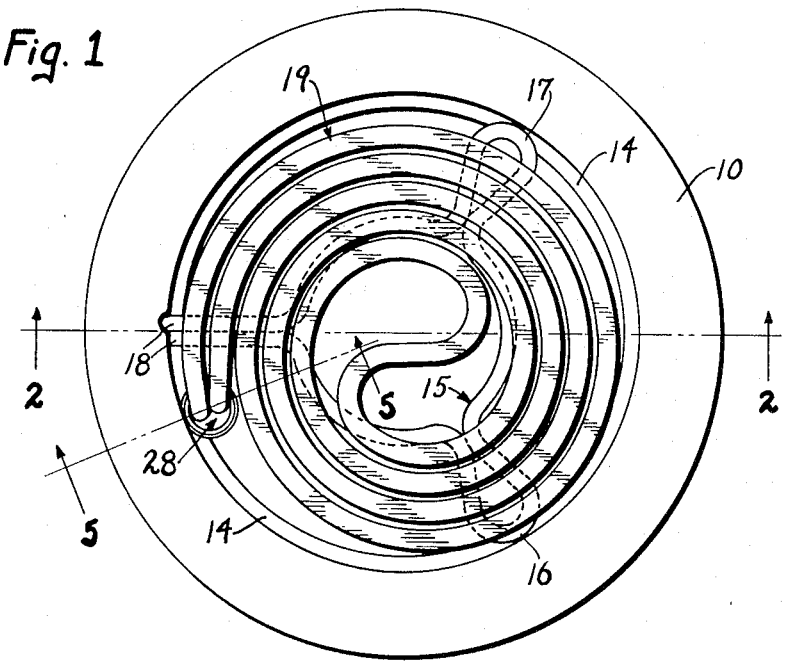
Figure 1 is a plan view of a heating element embodying the features of this invention.
Figure 2:
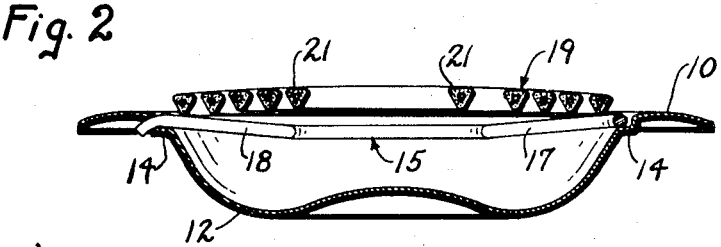
Figure 2 is a view, partly in section and partly in elevation, taken on the line 2—2 of Figure 1.

Referring to Figures 1 and 2 of the drawings, there is shown a heater comprising a ring 10 for supporting the heater in, for example, the opening in a range top, and a reflector and drip pan 12 which is disposed beneath the heater element. As herein shown the ring 10 and drip pan 12 are formed in one piece, and in such manner as to provide an inwardly extending annular ledge or shoulder 14 at substantially the junction of the ring 10 with the reflector and drip pan 12. It is understood, however, that the supporting ring 10 and reflector and drip pan 12 may be separate parts as is well known in the art.

Resting on the annular ledge or shoulder 14 is a spider or support 15 which, for illustrative purposes only, is shown as a support consisting of a single length of rod-like metal shaped to form two loops 16 and 17 which extend radially outwardly from the center, and a pair of radially extending legs 18 likewise extending outwardly from the center of the spider or support. The spider or support is so formed that the two loops 16 and 17 rest on the ledge or shoulder 14 at spaced points, and so that at least one of the legs 18 will extend through an opening in the ring or drip pan 12 immediately above the ledge or shoulder 14 to properly center or position the spider or support with respect to the ledge or shoulder 14 and to retain the spider or support in position. The spider or support 15 may take other forms.

As shown herein, a heating element 19 consisting of a tubular sheathed embedded-resistor element is wound upon itself, or otherwise shaped, to provide a series of convolutions and two terminal ends 20 for connection of the resistor of the heating element with a suitable source of current supply. The heating element 19, shown in Figures 1 through 6, is so shaped that the successive convolutions lie in successively higher planes, with the innermost convolution 21 being the highest, to thereby provide an article receiving area which is generally convex or frusto-conical in vertical cross section.

Figure 3:
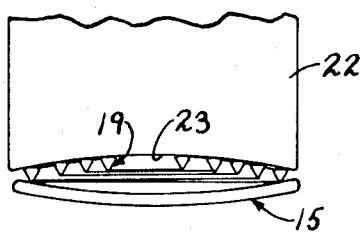
Figure 3 is a diagrammatic view showing a receptacle having a concave bottom surface disposed on the heating element.
Figure 4:
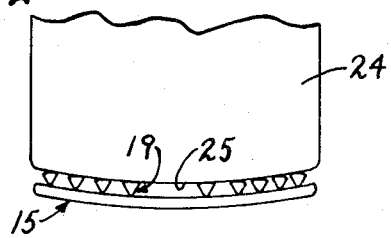
Figure 4 is a view similar to Figure 3, but showing a receptacle having a convex bottom surface disposed on the heating element.

As shown particularly in Figures 2, 3, and 4, the spider or support 15 has an upper surface which is dished, or angles from its outer circumference toward the center, to thereby provide a spider or support having a surface which is generally concave in vertical cross section, the outer convolution only of the heating element 19 normally being engaged and supported by the spider or support.

The tubular sheath of the heating element 19 is of such size and material that the element will have the required flexibility whereby the inner convolutions may be depressed under the influence of the weight of an article thereon, the material having such resiliency that the convolutions will spring back to their original position, wherein the heating element as a whole assumes a shape which is generally frusto-conical or convex in vertical cross section, when weight is removed therefrom.

With a construction as herein shown wherein the outer convolution only of the heating element 19 is normally supported on the spider or support which is, in turn, supported on the ledge or shoulder 14 and the inner convolutions are in successively higher planes and spaced above the spider or support 15 which is, in turn, concave in vertical cross section, the innermost convolutions of the heating element 19 are free to move downwardly under the weight of an article resting thereon until the article is supported by sufficient convolutions to sustain its weight, or until the convolutions on which the article rests are depressed to a degree sufficient to engage the upper surface of the spider or support 15 which acts as an interceptor and which is so designed with respect to the convolutions of the heating element 19 that downward movement of the convolutions under the weight of an article thereon will be intercepted and limited to a degree such that the elastic limit of the heating element, particularly under heating conditions, will not be exceeded.

Referring to Figures 3 and 4, there are illustrated receptacles having two types of heating element contacting bottoms. In Figure 3 there is shown a receptacle 22 having a bottom 23 which is generally concave. As shown, when such a receptacle is placed on the heating element 19, the various convolutions of the heating element, which is generally frusto-conical or convex in vertical cross section as a whole, will contact the entire bottom area of the receptacle 22 whereby heat from the heating element will be transferred to the receptacle by direct contact of the heating element convolutions rather than by convection.

In Figure 4 of the drawings there is shown a receptacle 24 having a heating element contacting bottom 25 which is generally convex. When such a receptacle is placed upon the heating element 19, the inner flexible convolutions of the heating element will be depressed in such manner that the convex bottom 25 will be contacted substantially throughout its area by the convolutions of the heating element 19 to provide for heating of the receptacle by direct contact of the heating element convolutions therewith. As also shown in Figure 4, the spider or support 15 intercepts the downward movement of the heating element convolutions and limits the depression thereof in such manner that the limit of elasticity of the sheath will not be exceeded.

In Figures 5 and 6 there is shown a hinge-type mounting for the heating element 19 so arranged as to permit the heating element to be lifted from its normal operative position and swung laterally from over the reflector or drip pan 12 so as to facilitate cleaning the reflector or drip pan 12 and the underside of the heating element 19.

The terminal ends 20 of the heating element 19 are shown as being bent downwardly to a position substantially perpendicular with the general plane of the heating element 19, and when the heating element 19 is assembled with the ring and the reflector and drip pan, the downwardly extending terminal ends 20 extend through an opening 26 in the reflector or drip pan 12.

The terminal ends 20 also extend through openings 27 in a cap 28 whose skirt 29 surrounds the upper end of a sleeve 30 disposed on the terminal ends 20 and secured thereto in a manner to prevent longitudinal movement of the terminal ends 20 in such sleeve. The cap 28 may, in turn, be brazed to the sleeve as at 31 or otherwise secured thereto, to prevent relative rotation of the sleeve and the cap. As shown particularly in Figure 6, the sleeve 30 is provided intermediate its ends with an outwardly extending ear 32, and is provided in its lowermost end with a pair of bayonet slots 34, only one of which is shown.

Another sleeve 35, which is the outer sleeve when assembled with the sleeve 30, is carried by a strap 36 rigidly secured to the bottom of the reflector or drip pan 12 as at 37. This sleeve 35 is provided with a pair of cam surfaces 38 which angle downwardly from one side of the sleeve to the other to terminate in a notch 39. A stop 40 is provided at the top of the cam surfaces for a purpose hereinafter described.

A ring 41 is provided, and such ring has a pair of inwardly extending ears 42 for engagement with the bayonet slots 34 of the sleeve 30, and is also provided with a pair of upstanding ears 43 and an opening 44, the opening 44 being adapted to receive the downturned end of a coiled spring 46. The uppermost and upturned end of the spring 46 engages with an opening 47 in the strap 36, as shown in Figure 5.

In the assembly and operation of this hinge mounting, the terminal ends 20 are disposed through the openings 27 in the cap 28 and through the sleeve 30, the cap and sleeve being rigidly secured to the terminal ends 20 as hereinbefore described. Then, with the heating element directly above the spider or support 15, the sleeve 30 containing the terminal ends 20 is positioned within the sleeve 35 which is rigidly mounted on the strap 36 beneath the opening 26 in the reflector or drip pan 12 and the assembly moved downwardly until the heating element 19 rests on the spider or support 15 and the ear 32 on the sleeve 30 rests in the notch 39 in the sleeve 35. The spring 46 is then positioned to surround the sleeve 35 with the upturned end 48 thereof disposed in the opening 47 in the strap 36, and the ring 41 is positioned on the end of the sleeve 30 with the downturned end 45 of the spring 46 within the opening 44 in the ring 41. The ring 41 is then rotated for one or more turns to wind-up the spring 46 and place the spring under tension, and the ears 42 on the ring engaged with the bayonet slots 34 in the sleeve 30 to prevent relative movement of the ring 41 and the sleeve 30. The spring 46 is such that the tendency thereof to resist compression will firmly hold the ear 32 in the notch 39.

When it is desired to swing the heating element 19 laterally away from a position over the reflector or drip pan 12, the heating element 19 is first moved upwardly to disengage the ear on the sleeve 30 from the notch 39. Then, the heating element 19 may be rotated about the axis of the sleeve 30 to move the heating element 19 laterally away from the reflector or drip pan 12, and such movement is assisted, or completely accomplished, by the tendency of the spring 46 to assume its unwound state. As the heating element 19 is moved laterally, the ear 32 on the sleeve 30 engages and rides up on one of the cam surfaces 38 on the sleeve 35 to continue to raise the heating element 19 as it is moved laterally by being rotated about the axis of the sleeve 30 so that the heating element will ultimately be spaced above the range top. This rotation of the sleeve 30 and lateral movement of the heating element 19 may continue until the ear 32 engages the stop 40 on the sleeve 35, and such unwinding tends to place the spring under compression.

When it is desired to reposition the heating element 19 over the reflector or drip pan 12, and with the outer convolution of the heating element resting on the spider or support 15, the heating element is moved laterally towards such desired position, such movement being assisted by the tendency of the spring to return to its normal expanded condition. Rotation of the sleeve 30 during such lateral movement of the heating element 19 winds up the spring 46 as the ear 32 rides on the downwardly angled cam surface 38 on the sleeve 35. Such rotation of the sleeve 30 and lateral movement of the heating element 19 may continue until the ear 32 registers with the notch 39 in the sleeve 35 at which time the sleeve 30 and the heating element 19 moves sharply downwardly by the expanding action of the compressed spring 46 until the ear 32 rests on the bottom of the notch 39 in the sleeve 35. When this occurs, the heating element 19 will overlie and be in registry with the reflector or drip pan 12, and the outer convolution of the heating element 19 will rest on the outer area of the spider or support 15. As is usual, terminals 50 are provided at the ends of the heating element 19 for connection to a suitable source of electric current.

Referring to the drawings in the preceding discourse, it will be seen that there has been provided a mounting for a heating element such that the heating element may be quickly and easily moved into and out of operative position, and is such that the movement into and out of operative position will be assisted by mechanical means, and also in which the heating element will be securely locked in its operative position. Various other features will be apparent.

What is claimed is:

1. An electric heater, comprising a heating element having an active portion defining an article receiving area, a mounting for said heating element, pivot means in part carried by said heating element and in part carried by said mounting, providing for lateral movement of said active portion relative to said mounting and providing also for edgewise shifting of said active portion from position in superimposed relation with respect to said mounting to position away from the same, and a latch means holding said heating element against edgewise movement of said active portion, said latch means being disengaged by lateral movement of said active portion to thereby free said heating element for edgewise shifting of said active portion.

2. An electric heater, comprising a heating element having an active portion defining an article receiving area, a mounting for said heating element, pivot means in part carried by said heating element and in part carried by said mounting, providing for lateral movement of said active portion relative to said mounting and providing also for edgewise shifting of said active portion from position in superimposed relation with respect to said mounting to position away from the same, latch means holding said heating element against edgewise movement of said active portion, said latch means being disengaged by lateral movement of such active portion to thereby free said heating element for edgewise shifting of said active portion, and spring means for yieldably holding said latch means in engaged relation.

3. An electric heater, comprising a heating element having an active portion defining an article receiving area, a mounting for said heating element, pivot means in part carried by said heating element and in part carried by said mounting, providing for lateral movement of said heating element relative to said mounting and providing also for edgewise shifting of said active portion from position in superimposed relation with respect to said mounting to position away from the same, latch means restricting edgewise movement of said active portion, said latch means being disengaged by lateral movement of said heating element to thereby provide for edgewise shifting of said active portion, torsion spring means urging said active portion in a direction away from superimposed relation relative to said mounting, said spring means also yieldably holding said latch means in engaged relation.

4. An electric heater, comprising a heating element having an active portion defining an article receiving area, a mounting for said heating element, pivot means in part carried by said heating element and in part carried by said mounting, providing for vertical movement of said active portion toward and away from said mounting and providing also for edgewise shifting of said active portion from position in superimposed relation with respect to said mounting to position away from the same, latch means holding said heating element against edgewise movement of said active portion, said latch means being disengaged by vertical movement of said active portion to thereby free said heating element for edgewise shifting of said active portion, and cam means effective when said latch means is disengaged to urge said active portion vertically simultaneously with edgewise shifting of said active portion.

5. An electric heater, comprising a heating element having an active portion defining an article receiving area, a mounting for said heating element, pivot means in part carried by said heating element and in part carried by said mounting, providing for vertical movement of said active portion toward and away from said mounting and providing also for edgewise shifting of said active portion from position in superimposed relation with respect to said mounting to position away from the same, latch means restricting edgewise movement of said active portion, said latch means being disengaged by vertical movement of said active portion to thereby provide for edgewise shifting of said active portion, and cam means effective when said latch means is disengaged to urge said active portion vertically simultaneously with edgewise shifting of said active portion, said latch means and said cam means having certain parts in common.

6. An electric heater, comprising a heating element having an active portion defining an article receiving area and also having at least two closely positioned downwardly extending terminal portions, a first sleeve secured to and disposed about said terminal portions and having a projecting lug, a reflector positioned beneath said heating element and having a second sleeve encircling said first sleeve and providing for vertical movement of said active portion toward and away from said reflector and also providing a pivot so that said active portion may be shifted edgewise from position in superimposed relation with respect to said mounting to position away from the same, said second sleeve having a cam surface and a vertical recess extending inwardly from said cam surface and adapted to receive said lug to hold said active portion against edgewise shifting movement, said projection being removed from said recess by vertical movement of said active portion away from said reflector and said lug thereupon being cooperable with said cam surface to urge said active portion vertically when the same is shifted in an edgewise manner.

7. An electric heater, comprising a heating element having an active portion defining an article receiving area and also having at least two closely positioned downwardly extending terminal portions, a first sleeve secured to and disposed about said terminal portions and having a projecting lug, a reflector positioned beneath said heating element and having a second sleeve encircling said first sleeve and providing for vertical movement of said active portion toward and away from said reflector and also providing a pivot so that said active portion may be shifted edgewise from position in superimposed relation with respect to said mounting to position away from the same, said second sleeve having a cam surface and a vertical recess extending inwardly from said cam surface and adapted to receive said lug to hold said active portion against edgewise shifting movement, said projection being removed from said recess by vertical movement of said active portion away from said reflector and said lug thereupon being cooperable with said cam surface to urge said active portion vertically when the same is shifted in an edgewise manner, and spring means releasably holding said lug in said recess and maintaining engagement between said lug and said cam surface.

8. An electric heater, comprising a heating element having an active portion disposed generally in a planar formation and a terminal portion extending off-center and angularly from said active portion, a non-rotatable mounting including a sleeve for receiving said terminal portion in hinge-like relation whereby said active portion may be swung in an edgewise direction, and a torsion spring having one part connected to said terminal portion and another part connected to said non-rotatable mounting, said spring providing a torsion force yieldably opposing edgewise rotation of said active portion in one direction and normally urging said active portion to a predetermined edgewise position.

References Cited in the file of this patent

UNITED STATES PATENTS

| 1,028,499 | Schott | June 4, 1912 |
| 1,998,308 | Causse | Apr. 16, 1935 |
| 2,028,604 | Hermanni | Jan. 21, 1936 |
| 2,467,348 | Tuttle | Apr. 12, 1949 |
| 2,506,554 | Tuttle | May 2, 1950 |
| 2,615,117 | Tillapaugh | Oct. 21, 1952 |

FOREIGN PATENTS

| 145,387 | Great Britain | July 2, 1920 |